United States Patent
Hebig et al.

(10) Patent No.: US 9,714,177 B2
(45) Date of Patent: Jul. 25, 2017

(54) REMOVAL OF HAB-PRODUCED TOXINS FROM BODIES OF WATER

(71) Applicant: International Business Machines Corporation, Armonk, NY (US)

(72) Inventors: Travis R. Hebig, Lakeville, MN (US); Joseph Kuczynski, North Port, FL (US); Steven R. Nickel, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 218 days.

(21) Appl. No.: 14/524,098

(22) Filed: Oct. 27, 2014

(65) Prior Publication Data
US 2016/0059166 A1    Mar. 3, 2016

Related U.S. Application Data

(63) Continuation of application No. 14/476,430, filed on Sep. 3, 2014.

(51) Int. Cl.
*B01D 37/04* (2006.01)
*C02F 1/26* (2006.01)
(Continued)

(52) U.S. Cl.
CPC ............ *C02F 1/26* (2013.01); *C02F 2101/30* (2013.01); *C02F 2103/007* (2013.01);
(Continued)

(58) Field of Classification Search
CPC .... C02F 1/26; C02F 2101/30; C02F 2209/36; C02F 2103/08; C02F 2209/006; C02F 2103/007
See application file for complete search history.

(56) References Cited

U.S. PATENT DOCUMENTS

| 4,959,158 A | 9/1990 | Meikrantz |
|---|---|---|
| 5,024,647 A | 6/1991 | Jubin et al. |

(Continued)

FOREIGN PATENT DOCUMENTS

| JP | 57119886 A | 7/1982 |
|---|---|---|
| JP | 57136997 A | 8/1982 |

(Continued)

OTHER PUBLICATIONS

"What are HABs", printed from <http://habsos.noaa.gov/about/> on Jul. 16, 2014, 2 pages.

(Continued)

*Primary Examiner* — Shogo Sasaki
(74) *Attorney, Agent, or Firm* — Matthew J. Bussan

(57) ABSTRACT

One or more brevetoxins or other toxins produced by red tides or other harmful algal blooms (HABs) are removed from a body of water by contacting an aqueous phase containing water, algae and one or more HAB-produced toxins with an organic phase, extracting the one or more toxins into the organic phase, and separating the organic phase enriched in the one or more toxins from the aqueous phase depleted in the one or more toxins. In some embodiments, the organic phase is comprised of vegetable oil, mineral oil, or other suitable oil. In some embodiments, an annular centrifugal contactor is used to accomplish the contacting, extracting, and separating. In some embodiments, the toxin-depleted aqueous phase is pumped back into the source of the aqueous phase, and the toxin-enriched organic phase is recirculated until a predetermined threshold concentration of the one or more toxins is met.

7 Claims, 6 Drawing Sheets

Figure 3:
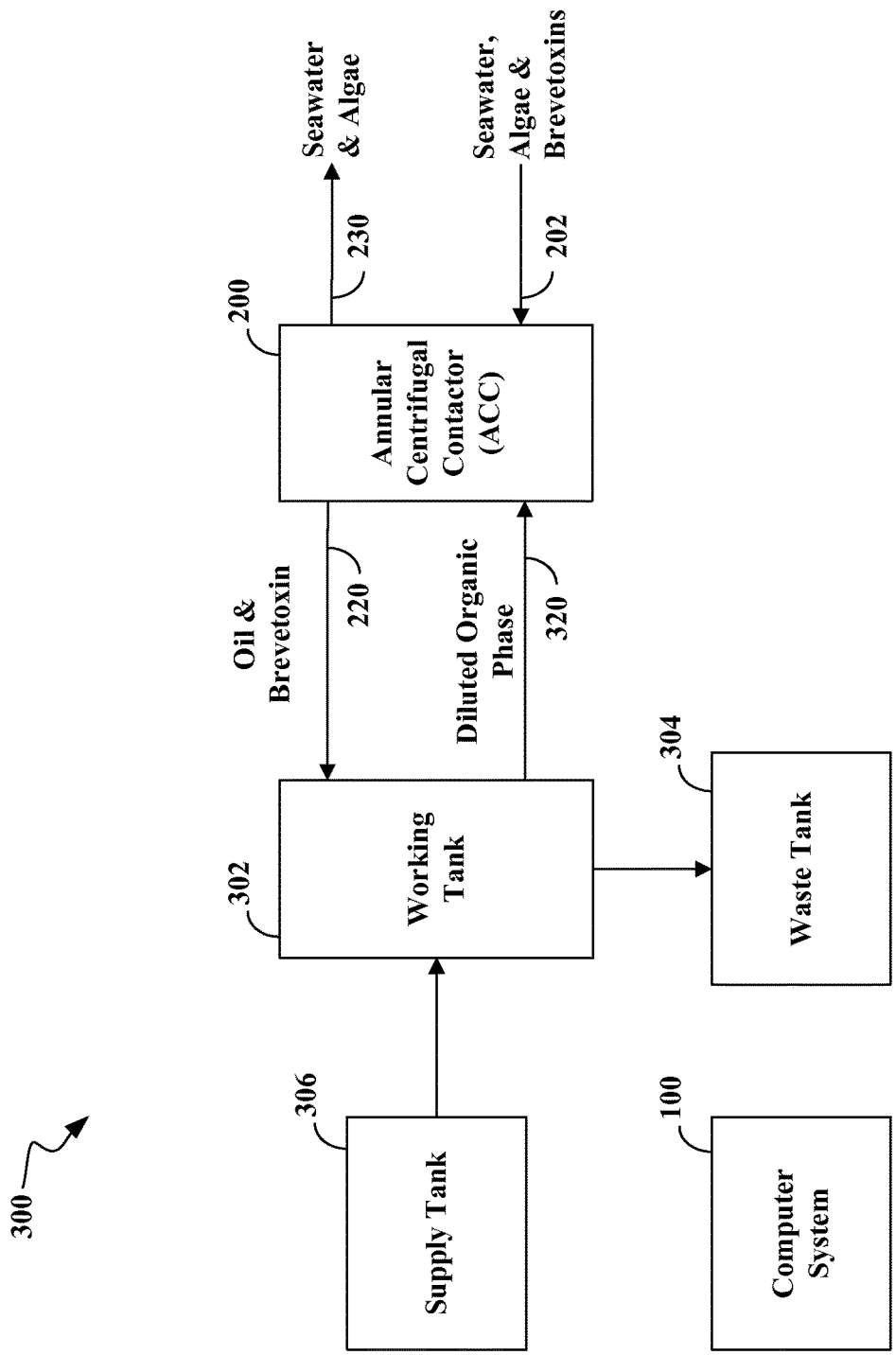

(51) Int. Cl.
  *C02F 101/30* (2006.01)
  *C02F 103/00* (2006.01)
  *C02F 103/08* (2006.01)
(52) U.S. Cl.
  CPC .... *C02F 2103/08* (2013.01); *C02F 2209/006* (2013.01); *C02F 2209/36* (2013.01)

(56) References Cited

U.S. PATENT DOCUMENTS

| | | | |
|---|---|---|---|
| 5,571,070 | A | 11/1996 | Meikrantz et al. |
| 5,591,340 | A | 1/1997 | Meikrantz et al. |
| 5,762,800 | A | 6/1998 | Meikrantz et al. |
| 5,908,376 | A | 6/1999 | Macaluso et al. |
| 5,944,986 | A | 8/1999 | Saho et al. |
| 6,071,859 | A | 6/2000 | Ogawa et al. |
| 6,363,611 | B1 | 4/2002 | Sheldon et al. |
| 6,440,054 | B1* | 8/2002 | Galik ............... B01D 11/0461 494/22 |
| 7,134,991 | B2* | 11/2006 | Rivalier ............ B01D 11/048 494/22 |
| 7,157,061 | B2 | 1/2007 | Meikrantz et al. |
| 7,597,862 | B2 | 10/2009 | Meikrantz et al. |
| 7,632,414 | B2* | 12/2009 | Hsu ..................... C02F 1/66 210/764 |
| 7,736,610 | B2 | 6/2010 | Meikrantz et al. |
| 7,832,920 | B2* | 11/2010 | Wood ................ B01F 3/04531 366/170.3 |
| 8,003,778 | B1 | 8/2011 | Paul et al. |
| 2011/0036727 | A1 | 2/2011 | Cao et al. |
| 2012/0152855 | A1 | 6/2012 | Lean et al. |
| 2012/0202289 | A1* | 8/2012 | Aidun .................. C12N 5/00 435/410 |
| 2016/0060138 | A1 | 3/2016 | Hebig et al. |

FOREIGN PATENT DOCUMENTS

| | | |
|---|---|---|
| JP | 06001701 A | 1/1994 |
| WO | WO2007126189 A1 | 11/2007 |
| WO | WO2009125897 A1 | 10/2009 |

OTHER PUBLICATIONS

"The Truth About Red Tides Manmade Causes and Health Effects", printed from <http://www.activistpost.com/2013/01/the-truth-about-red-tides-manmade.html> on Jul. 16, 2014, 6 pages.
"CINC Industries—Home", printed from <http://www.cincind.com/> on Jul. 16, 2014, 2 pages.
"Harvesting Algae", printed from <http://www.et.byu.edu/~wanderto/homealgaeproject/Harvesting%20Algae.html> on Jul. 16, 2014, 5 pages.
Pierce et al., "Removal of harmful algal cells (*Karenia brevis*) and toxins from seawater culture by clay flocculation", Harmful Algae, vol. 3, Issue 2, 2004, pp. 141-148.
"Brevetoxins", printed from <http://www.drugfuture.com/chemdata/brevetoxins.html> on Jul. 18, 2014, 2 pages.
"Harmful Algal Blooms (HABs)", printed from <http://www.cdc.gov/nceh/hsb/hab/> on Aug. 7, 2014, 3 pages.
Wikipedia contributors, "Algal bloom", Wikipedia, The Free Encyclopedia, http://en.wikipedia.org/w/index.php?oldid=616214364 (accessed Aug. 1, 2014).
Wikipedia contributors, "Brevetoxin", Wikipedia, The Free Encyclopedia, http://en.wikipedia.org/w/index.php?oldid=617005629 (accessed Aug. 2, 2014).
Wikipedia contributors, "Ciguatoxin", Wikipedia, The Free Encyclopedia, http://en.wikipedia.org/w/index.php?oldid=608390221 (accessed Aug. 2, 2014).
Wikipedia contributors, "Karenia brevis", Wikipedia, The Free Encyclopedia, http://en.wikipedia.org/w/index.php?oldid=575747987 (accessed Aug. 2, 2014).
Wikipedia contributors, "Red tide", Wikipedia, The Free Encyclopedia, http://en.wikipedia.org/w/index.php?oldid=619187621 (accessed Aug. 1, 2014).
Deshpande, "Handbook of Food Toxicology", CRC Press, Aug 28, 2002, pp. 719-721.
Twiner et al., "Extraction and analysis of lipophilic brevetoxins from the red tide dinoflagellate Karenia brevis", Analytical Biochemistry, 369, 2007, pp. 128-135.
Woofter et al., "Uptake and Elimination of Brevetoxin in Blood of Striped Mullet (Mugil cephalus) after Aqueous Exposure to Karenia brevis", Environmental Health Perspectives, vol. 113, No. 1, 2005, pp. 11-16.

* cited by examiner

100

112 — I/O Devices

Electronic Device
160

Network
155

105 — CPU

110 — I/O Device Interface

115 — Network Interface

Interconnect (Bus) — 120

125 — Memory

Brevetoxin Removal Application
135

Measured Brevetoxin Conc.
140

Threshold Brevetoxin Conc.
145

130 — Storage

FIG. 1

FIG. 2

```
400
    ┌─────────┐
    │  BEGIN  │
    └─────────┘
         ↓
┌─────────────────────────────────────────────────┐ — 402
│ PROVIDE AN AQUEOUS PHASE INCLUDING SEAWATER,    │
│ ALGAE, AND ONE OR MORE TOXINS PRODUCED BY A     │
│ HARMFUL ALGAL BLOOM (HAB)                       │
└─────────────────────────────────────────────────┘
         ↓
┌─────────────────────────────────────────────────┐ — 404
│ CONTACT THE AQUEOUS PHASE WITH AN ORGANIC PHASE │
└─────────────────────────────────────────────────┘
         ↓
┌─────────────────────────────────────────────────┐ — 406
│ EXTRACT THE ONE OR MORE HAB-PRODUCED TOXINS INTO│
│ THE ORGANIC PHASE                               │
└─────────────────────────────────────────────────┘
         ↓
┌─────────────────────────────────────────────────┐ — 408
│ SEPARATE THE TOXIN-ENRICHED ORGANIC PHASE FROM  │
│ THE TOXIN-DEPLETED AQUEOUS PHASE                │
└─────────────────────────────────────────────────┘
         ↓
    ┌─────────┐
    │   END   │
    └─────────┘
```

FIG. 4

```
                                    ┌─────────┐
                              500   │  BEGIN  │
                                    └────┬────┘
                                         ▼                           ─ 502
      ┌──────────────────────────────────────────────────────────┐
      │ ACTIVATE A LIQUID-LIQUID EXTRACTION SYSTEM FOR           │
 ┌───▶│ REMOVING ONE OR MORE TOXINS PRODUCED BY A                │
 │    │ HARMFUL ALGAL BLOOM (HAB) FROM A BODY OF WATER           │
 │    └──────────────────────────┬───────────────────────────────┘
 │                               ▼                                 ─ 504
 │    ┌──────────────────────────────────────────────────────────┐
 │    │ FLOW AN ORGANIC PHASE ENRICHED IN ONE OR MORE            │
 │    │ HAB-GENERATED TOXINS INTO A WORKING TANK                 │◀─┐
 │    │ CONTAINING A SECOND ORGANIC PHASE TO PRODUCE             │  │
 │    │ A DILUTED ORGANIC PHASE                                  │  │
 │    └──────────────────────────┬───────────────────────────────┘  │
 │                               ▼                                 ─ 506
 │    ┌──────────────────────────────────────────────────────────┐  │
 │    │ RECIRCULATE THE DILUTED ORGANIC PHASE                    │  │
 │    └──────────────────────────┬───────────────────────────────┘  │
 │                               ▼                                 ─ 508
 │    ┌──────────────────────────────────────────────────────────┐  │
 │    │ MEASURE A CONCENTRATION OF THE ONE OR MORE               │  │
 │    │ HAB-GENERATED TOXINS IN THE DILUTED ORGANIC PHASE        │  │
 │    └──────────────────────────┬───────────────────────────────┘  │
 │                               ▼           ─ 510                  │
 │                           ◇ CONCENTRATION ◇                      │
 │                           ◇   EXCEEDS     ◇ ──N──────────────────┘
 │                           ◇  THRESHOLD?   ◇
 │                               │
 │                               Y
 │                               ▼                                 ─ 512
 │    ┌──────────────────────────────────────────────────────────┐
 │    │ DEACTIVATE THE LIQUID-LIQUID EXTRACTION SYSTEM           │
 │    └──────────────────────────┬───────────────────────────────┘
 │                               ▼
 │     (B)                      (A)
 └──────┘
```

FIG. 5A

REMOVAL OF HAB-PRODUCED TOXINS FROM BODIES OF WATER

CROSS-REFERENCE TO RELATED APPLICATION

This patent application is a continuation application of pending U.S. patent application Ser. No. 14/476,430, filed Sep. 3, 2014, entitled "REMOVAL OF HAB-PRODUCED TOXINS FROM BODIES OF WATER", which is hereby incorporated herein by reference in its entirety.

BACKGROUND

The present invention relates in general to the removal of brevetoxins and other toxins from harmful algal blooms (HABs), such as blooms of *Karenia brevis* also known as "red tides". More particularly, the present invention relates to a method, apparatus and computer program product for removing one or more HAB-produced toxins from a body of water using an annular centrifugal contactor.

SUMMARY

In accordance with some embodiments of the present invention, one or more brevetoxins or other toxins produced by red tides or other harmful algal blooms (HABs) are removed from a body of water by contacting an aqueous phase containing water, algae and one or more HAB-produced toxins with an organic phase, extracting the one or more toxins into the organic phase, and separating the organic phase enriched in the one or more toxins from the aqueous phase depleted in the one or more toxins. In some embodiments, the organic phase is comprised of vegetable oil, mineral oil, or other suitable oil. In some embodiments, an annular centrifugal contactor is used to accomplish the contacting, extracting, and separating. In some embodiments, the toxin-depleted aqueous phase is pumped back into the source of the aqueous phase, and the toxin-enriched organic phase is recirculated until a predetermined threshold concentration of the one or more toxins is met.

BRIEF DESCRIPTION OF THE SEVERAL VIEWS OF THE DRAWINGS

Embodiments of the present invention will hereinafter be described in conjunction with the appended drawings, where like designations denote like elements.

FIG. 1 illustrates an exemplary representation of a computer system for controlling the removal of one or more brevetoxins from red tide in accordance with some embodiments of the present invention.

Figure 2:
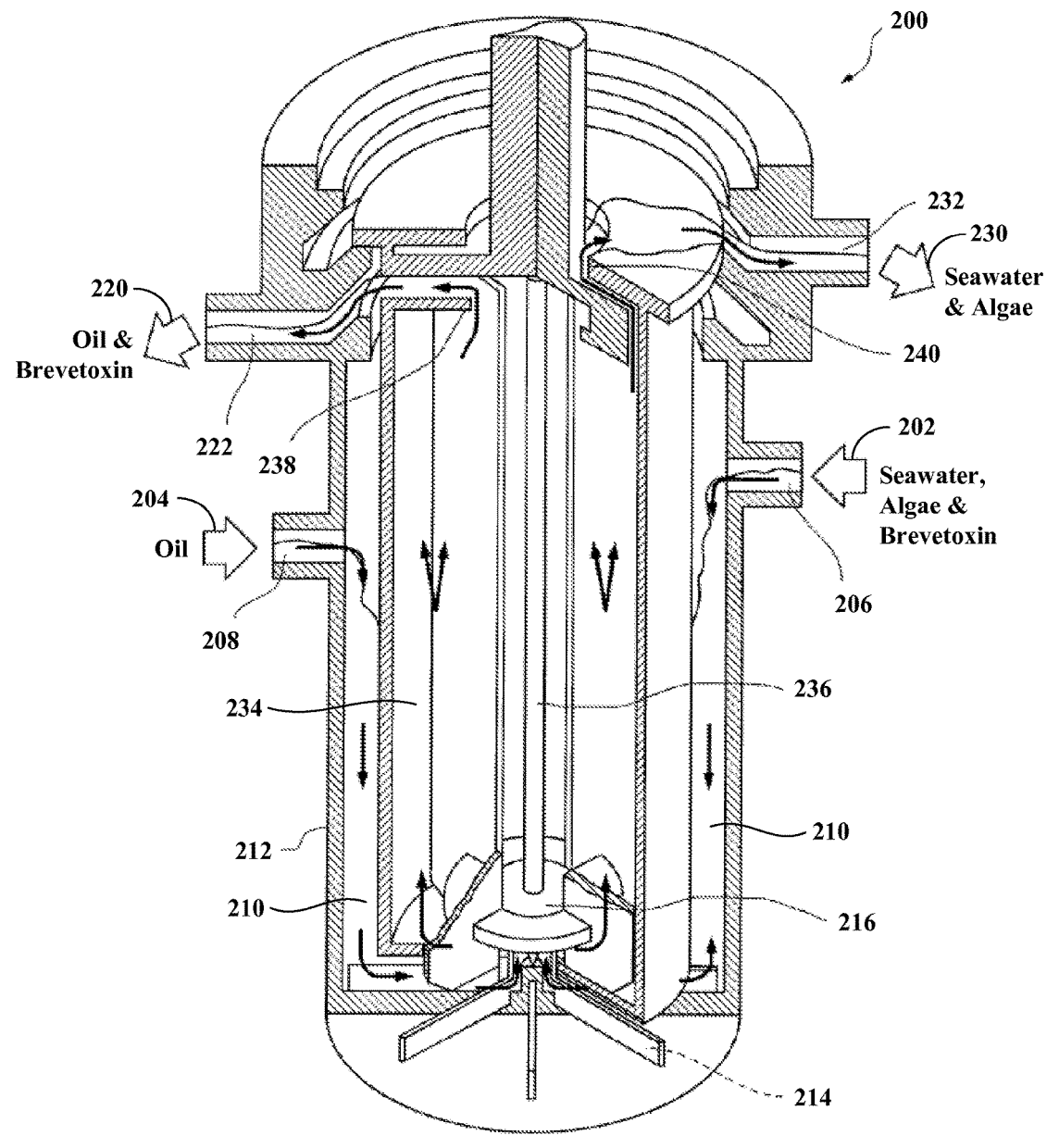

FIG. 2 illustrates an exemplary representation of an annular centrifugal contactor configured to remove one or more brevetoxins from red tide in accordance with some embodiments of the present invention.

FIG. 3 illustrates an exemplary representation of a brevetoxin removal system, which incorporates the computer system illustrated in FIG. 1 and the annular centrifugal contractor illustrated in FIG. 2, in accordance with some embodiments of the present invention.

FIG. 4 illustrates a flow diagram of a method for removing one or more HAB-produced toxins from a body of water in accordance with some embodiments of the present invention.

FIGS. 5A and 5B illustrate a flow diagram of a method for controlling the removal of one or more HAB-produced toxins from a body of water in accordance with some embodiments of the present invention.

DETAILED DESCRIPTION

An algal bloom is a rapid increase in the concentration of certain types of microscopic algae in a body of water. Algal blooms occur in marine, estuarine, and fresh waters. These algae, known as phytoplankton, in high concentrations can form dense, visible areas near the water's surface. Most phytoplankton species are essential to marine and freshwater ecosystems. Certain species of phytoplankton, however, produce toxins that are harmful to the health of the environment, plants, animals, and people. Of the 5000 known species of phytoplankton, about 100 species are known to be toxic or harmful.

Harmful algal blooms (HABs) are algal blooms involving toxic or otherwise harmful phytoplankton. Such phytoplankton include dinoflagellates of the genus *Karenia* and *Alexandrium*, as well as diatoms of the genus *Pseudo-nitzschia*. For example, under certain environmental conditions, a single-celled dinoflagellate called *Karenia brevis* (*K. brevis*) reproduce rapidly, creating blooms that can make the water's surface appear red or brown. These blooms are often referred to as "red tides." Red tides, which can be green, brown, red, or colorless, occur throughout the world. Some red tides are associated with the production of natural toxins, depletion of dissolved oxygen, or other harmful effects, and are thus generally described as HABs.

*K. brevis* was formerly known as *Gymnodinium breve* and *Ptychodiscus brevis* (*P. brevis*). *K. brevis* produces a suite of cyclic polyether neurotoxins known as brevetoxins (PbTXs or BTXs). At least ten brevetoxins have been identified. Brevetoxins may be divided into two groups based on their backbone structures, i.e., brevetoxin-A (which has ten cyclic rings) and brevetoxin-B (which has eleven cyclic rings). The chemical structures of brevetoxin-A and brevetoxin-B are illustrated below. Brevetoxin-A includes brevetoxin-1 (PbTX-1), brevetoxin-7 (PbTX-7), and brevetoxin-10 (PbTX-10). Brevetoxin-B includes brevetoxin-2 (PbTX-2), brevetoxin-3 (PbTX-3), brevetoxin-5 (PbTX-5), brevetoxin-6 (PbTX-6), brevetoxin-8 (PbTX-8), and brevetoxin-9 (PbTX-9). The chemical structure of brevetoxin-4 (PbTX-4) is unconfirmed. Brevetoxins are lipid (oil) soluble.

[Structure: Brevetoxin-A]

BREVETOXIN-1 (PBTX-1) R=—CH$_2$C(=CH$_2$)CHO
BREVETOXIN-7 (PBTX-7) R=—CH$_2$C(=CH$_2$)CH$_2$OH
BREVETOXIN-10 (PBTX-10) R=—CH$_2$CH(—CH$_3$) CH$_2$OH

[Structure: Brevetoxin-B]

Brevetoxin-2 (PbTX-2) R$_1$=H, R$_2$=—CH$_2$C(=CH$_2$)CHO
Brevetoxin-3 (PbTX-3) R$_1$=H, R$_2$=—CH$_2$C(=CH$_2$) CH$_2$OH
Brevetoxin-5 (PbTX-5) R$_1$=COCH$_3$, R$_2$=—CH$_2$C(=CH$_2$) CHO
Brevetoxin-6 (PbTX-6) R$_1$=H, R$_2$=—CH$_2$C(=CH$_2$)CHO (27,28-β-epoxide)
Brevetoxin-8 (PbTX-8) R$_1$=H, R$_2$=—CH$_2$COCH$_2$Cl
Brevetoxin-9 (PbTX-9) R$_1$=H, R$_2$=—CH$_2$CH(CH$_3$) CH$_2$OH Other marine microalgae associated with HABs also produce toxins. For example, *Gambierdiscus toxicus*, a dinoflagellate which is associated with ciguatera tides, produces ciguatoxins (CTXs). Ciguatoxins are lipid (oil) soluble. *Gambierdiscus toxicus* also produces maitotoxin (MTX). *Alexandrium fundyense*, a dinoflagellate associated with HABs, produces saxitoxin (STX). The genus *Pseudo-nitzschia* includes several species of diatoms associated with HABs that produce the neurotoxin known as domoic acid (DA). In addition, cyanobacteria (also known as blue-green algae) are associated with HABs and produce cyanotoxins. Although cyanobacteria is a phylum of bacteria, for purposes of this document, including the claims, cyanobacteria and other prokaryotic organisms are encompassed within a broad definition of algae. Toxins produced by HABs are generally lipid (oil) soluble. The present invention takes advantage of the solubility of HAB-produced toxins in vegetable oils, mineral oils, and other suitable oils.

In accordance with some embodiments of the present invention, one or more brevetoxins or other toxins produced by red tides or other HABs are removed from a body of water by contacting an aqueous phase containing water, algae and one or more HAB-produced toxins with an organic phase, extracting the one or more toxins into the organic phase, and separating the organic phase enriched in the one or more toxins from the aqueous phase depleted in the one or more toxins. In some embodiments, the organic phase is comprised of vegetable oil, mineral oil, or other suitable oil. In some embodiments, an annular centrifugal contactor is used to accomplish the contacting, extracting, and separating. In some embodiments, the toxin-depleted aqueous phase is pumped back into the source of the aqueous phase, and the toxin-enriched organic phase is recirculated until a predetermined threshold concentration of the one or more toxins is met.

Some of the embodiments in this document are described in terms of an exemplary application, i.e., the removal of one or more brevetoxins from red tide. Such embodiments are set forth for purposes of explanation, not limitation. One skilled in the art will appreciate that the present invention is more generally applicable to the removal of any (oil soluble) HAB-produced toxin from any body of water.

In accordance with some embodiments of the present invention, seawater containing the HAB can be collected, for example, at the outset of a HAB. The invention takes advantage of the lipid (oil) soluble properties of the toxins produced by HABs. Use of liquid-liquid centrifugation with an extraction zone or chamber can remove the lipid (oil) soluble brevetoxins from seawater. Commercial scale liquid-liquid centrifugation devices (also referred to as "separators", "extractors" and "contactors", as well as "centrifugal separators", "centrifugal extractors", "centrifugal contactors", "annular centrifugal contactors", and "ACCs") are well known in various fields and have been used, for example, to separate oil from seawater in the Deepwater Horizon disaster. These high efficiency, high speed devices may be mounted shipboard. State of the art commercial scale liquid-liquid centrifugation devices can process up to 200 gallons per minute (GPM), with next generation devices having throughputs reaching 600 GPM. Precharging the extraction chamber of the liquid-liquid centrifugation device with an environmentally benign mineral oil or other suitable oil in accordance with some embodiments of the present invention, will result in effective extraction of brevetoxin from the HAB into the oil phase which can be recycled back into the extraction zone or chamber. Once the oil becomes saturated with brevetoxin (which may be, for example, empirically determined), the brevetoxin-saturated oil is stored and used in various other applications. Fresh oil is then added to the extractor and the process continues. Brevetoxin-depleted seawater is pumped back into the ocean. Huge volumes of water may be processed shipboard in a continuous extraction loop.

FIG. 1 illustrates an exemplary representation of a computer system 100 connected to one or more electronic devices 160 (e.g., an embedded controller of one or more annular centrifugal contactors) via a network 155, for controlling the removal of one or more brevetoxins from red tide in accordance with some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a brevetoxin removal application 135, one or more measured brevetoxin concentration values 140, and one or more predetermined threshold brevetoxin concentration values 145. Although these elements are illustrated as residing in the memory 125, any of the elements, or combinations thereof, may reside in the storage 130 or partially in the memory 125 and partially in the storage 130. The brevetoxin removal application 135 has a set (at least one) of program modules that, in conjunction with the annular centrifugal contactor 200 (shown in FIG. 2) and/or other components of the brevetoxin removal system 300 (shown in FIG. 3), generally carry out the functions and/or methodologies of embodiments of the invention as described herein.

The network 155 may be any suitable network or combination of networks and may support any appropriate protocol suitable for communication of data and/or code to/from the computer system 100 and the electronic device 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

As shown, there may be one or more electronic devices 160 connected to the computer system 100 via the network 155. The electronic device 160 may include some or all of the hardware and software elements of the computer system 100 previously described. For the purposes of this disclosure, the electronic device 160 may represent practically any type of computer, computer system, or other programmable electronic device, including but not limited to, a client computer, a server computer, a portable computer, a handheld computer, an embedded controller, etc.

Reference is now made to FIG. 2, which illustrates an exemplary representation of an annular centrifugal contactor (ACC) 200 configured to remove one or more brevetoxins from red tide in accordance with some embodiments of the present invention. The ACC is known as a "contactor" because it enables the organic phase and the aqueous phase to be brought into intimate contact with one another. ACCs are commercially available, such as from CINC Industries, Inc. (Carson City, Nev.), and provide a high throughput method of performing liquid-liquid extraction. Suitable commercially available ACCs include, but are not limited to, Model V-16 (max throughput=90 GPM) and Model V-20 (max throughput=200 GPM) available from CINC Industries, Inc. In accordance with some embodiments of the present invention, the ACC 200 is configured to be able to contact aqueous and organic phases and to be able to mix and separate the organic and aqueous phases in a single device. As such, the ACC 200 may enable a process in accordance with some embodiments of the present invention to be automated (e.g., using the computer system 100 shown in FIG. 1) and utilize very little operator involvement. Examples of ACCs include those described in U.S. Pat. Nos. 5,591,340 and 7,736,610 to Meikrantz et al., the disclosure of each of which is incorporated by reference herein.

As shown in FIG. 2, a mixture of seawater, algae and brevetoxin 202 (also referred to herein as an "aqueous phase") and vegetable oil, mineral oil, or other suitable oil 204 (also referred to herein as an "organic phase") are introduced into the ACC 200 through input ports 206, 208. The aqueous phase 202 and the organic phase 204 may be separately introduced into the ACC 200 through the inlet ports 206, 208, respectively, or may be introduced as a mixed phase through inlet ports 206, 208. Hence, the input port 206 may be a "heavier phase inlet port" or, alternatively, as a "mixed phase inlet port". Likewise, the inlet port 208 may be a "lighter phase inlet port" or, alternatively, as a "mixed phase inlet port".

Suitable oils include, but are not limited to, vegetable oils, mineral oils, and combinations thereof. Suitable vegetable oils include, but are not limited to, plant oils that are liquid at room temperature such as palm oil, soybean oil, canola oil, sunflower oil, peanut oil, cottonseed oil, palm kernel oil, coconut oil, olive oil, corn oil, grape seed oil, hazelnut oil and other nut oils, linseed oil, rice bran oil, safflower oil and sesame oil. Suitable mineral oils include, but are not limited to, light mixtures of alkanes in the C15 to C40 range and cyclic paraffins from non-vegetable (i.e., "mineral") sources. Typically, mineral oils are liquid byproducts produced during the distillation of petroleum products. Suitable oils are preferably environmentally benign and non-toxic.

In accordance with some embodiments of the present invention, vegetable oil, mineral oil, or other suitable oil 204 (organic phase) is charged into the lighter phase inlet port 208 of the ACC 200 and mixed with the brevetoxin-containing seawater 202 (aqueous phase) delivered via the heavier phase inlet port 206 of the ACC 200. Mixing of the aqueous phase 202 and the organic phase 204 occurs in an annular mixing zone 210 of the ACC 200. If additional mixing is required or desired, a separate pre-mix vessel (not shown) may be added inline before the lighter phase inlet port 208 to ensure adequate mixing of the aqueous phase 202 and the organic phase 204. The aqueous phase 202 and the organic phase 204 are introduced in the annular mixing zone 210 of the ACC 200 and migrate downward to a floor of housing 212 of the ACC 200. Radial vanes 214 direct the mixed phase into the interior of a hollow rotor 216.

As the mixed phase is processed through the ACC 200, the brevetoxin is solubilized into the organic phase 204, and brevetoxin-enriched oil 220 is pumped out of a lighter phase outlet port 222 of the ACC 200. The brevetoxin-enriched oil 220 can then be recirculated back into the lighter phase inlet port 208 of the ACC 200 via a closed loop (not shown). Brevetoxin-depleted seawater 230 is pumped out of a heavier phase outlet port 232 of the ACC 200.

More particularly, centrifugal force of rotation of the hollow rotor 216 forces the more dense phase, i.e., the brevetoxin-depleted seawater 230, outward against a wall 234 of the hollow rotor 216. The less dense phase, i.e., the brevetoxin-enriched oil 220, is displaced radially inwardly towards a shaft 236 of the hollow rotor 216. The brevetoxin-enriched oil 220 flows over a lighter phase weir 238 and is collected in a channel from which it exits the ACC 200 at the lighter phase outlet port 222. The brevetoxin-depleted seawater 230 flows over a heavier phase weir 240 and is collected in a channel from which it exits the ACC 200 at the heavier phase outlet port 232.

At a predetermined time, the concentration of brevetoxin in the brevetoxin-enriched oil 220 is determined, the brevetoxin-enriched oil 220 is stored in a storage tank (not shown) for later use or disposal, and a fresh charge of unused oil from a supply tank (not shown) is added to the ACC 200. Brevetoxin-depleted seawater 230 is pumped back into the ocean as it exits the heavier phase outlet port 232 of the ACC 200.

FIG. 3 illustrates an exemplary representation of a brevetoxin removal system 300, which incorporates the computer system 100 illustrated in FIG. 1 and the annular centrifugal contractor 200 illustrated in FIG. 2, in accordance with some embodiments of the present invention. The brevetoxin removal system 300 also includes a working tank 302, a waste tank 304 and a supply tank 306. In accordance with some embodiments of the present invention, some or all of the components of the brevetoxin removal system 300 are mounted aboard a boat floating proximate a water column containing a HAB.

The brevetoxin-enriched oil 220 is flowed into the working tank 302, which initially contains fresh oil from the supply tank 306, and is mixed with the contents of the working tank 302 to produce a diluted organic phase 320. The diluted organic phase 320 is flowed into the lighter phase inlet port (208 in FIG. 2) of the ACC 200. Hence, the brevetoxin-enriched oil 220 is diluted to produce the diluted organic phase 320, which is recirculated as the organic phase.

The working tank 302 may contain a sensor (not shown) for measuring the concentration of the brevetoxin in the diluted organic phase 320. This measured brevetoxin concentration is used to determine whether a predetermined threshold brevetoxin concentration has been met. The predetermined threshold may be the brevetoxin concentration at which the oil becomes saturated with brevetoxin or some other suitable concentration (e.g. a concentration at which the efficiency of the ACC 200 diminishes to an unsatisfactory level). When the measured brevetoxin concentration exceeds the predetermined threshold, the ACC 200 is deactivated and the diluted organic phase 320 is removed from the working tank 302 by flowing it into the waste tank 304. After substantially all of the diluted organic phase 320 has been removed from the working tank 302, fresh oil from the supply tank 306 is flowed into the working tank 302. The ACC 200 is then re-activated.

The waste tank 304 may contain a sensor (not shown) for measuring the fluid level of the diluted organic phase contained therein. This measured fluid level may be used to determine whether the waste tank 304 has sufficient capacity remaining to accommodate the diluted organic phase to be received from the working tank 302.

The supply tank 306 may contain a sensor (not shown) for measuring the fluid level of the fresh oil contained therein. This measured fluid level may be used to determine whether the supply tank 306 has a sufficient supply of fresh oil to charge the working tank 302.

In accordance with some embodiments of the present invention, the brevetoxin removal application (135 in FIG. 1) residing on the computer system 100 may be configured to control the activation/deactivation of the ACC 200 by turning on/off an electric motor (not shown) that rotates the hollow rotor (216 in FIG. 2) of the ACC 200, as well as to control the flow of the brevetoxin-enriched oil 220 and the diluted organic phase 320 by controlling pumps (not shown) and/or valves (not shown) that may be installed between the lighter phase outlet port (222 in FIG. 2) of the ACC 200 and an inlet port of working tank 302 and between an outlet port of the working tank 302 and the lighter phase inlet port (208 in FIG. 2).

In addition, the brevetoxin removal application (135 in FIG. 1) residing on the computer system 100 may be configured to control the flow of the brevetoxin-containing seawater 202 into the ACC 220 and the brevetoxin-depleted seawater 230 from the ACC 220 by controlling pumps (not shown) and/or valves (not shown) that may be installed between the heavier phase inlet port (206 in FIG. 2) and the ocean and between the heavier phase outlet port (232 in FIG. 2) and the ocean.

Also, the brevetoxin removal application (135 in FIG. 1) residing on the computer system 100 may be configured to make the determination of whether the measured brevetoxin concentration exceeds the predetermined threshold by comparing the measured brevetoxin concentration (140 in FIG. 1) and the threshold brevetoxin concentration (145 in FIG. 1), and to control the flow of the diluted organic phase from the working tank 302 into the waste tank 304 and flow of the fresh oil from the supply tank 306 into the working tank 302 by controlling pumps (not shown) and/or valves (not shown) that may be installed between those tanks.

In addition, the brevetoxin removal application (135 in FIG. 1) residing on the computer system 100 may also be configured to make the determination of whether the waste tank 304 has sufficient capacity remaining to accommodate the diluted organic phase to be received from the working tank 302 based on the measured fluid level of the diluted organic phase contained in the waste tank 304, and to make the determination of whether the supply tank 306 has a sufficient supply of fresh oil to charge the working tank 302 based on the measured fluid level in the supply tank 306.

FIG. 4 illustrates a flow diagram of a method 400 for removing one or more HAB-produced toxins from a body of water in accordance with some embodiments of the present invention. In the method 400, the steps discussed below (steps 402-408) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The method 400 begins by providing an aqueous phase including water, algae, and one or more toxins produced by a HAB (step 402). For example, a mixture of seawater, *Karenia brevis* (*K. brevis*), and one or more brevetoxins produced by the *K. brevis* may be pumped from the ocean into the heavier phase inlet port of an annular centrifugal contactor (ACC). The mixture may be, for example, pumped from the upper portion of a water column containing a HAB, e.g., red tide caused by *K. brevis*.

Then, the method 400 continues as the aqueous phase is contacted with an organic phase (step 404). For example, an organic phase containing a vegetable oil, mineral oil, or other suitable oil may be introduced into a lighter phase inlet port of the ACC, which includes an annular mixing zone where the aqueous phase contacts the organic phase.

The method 400 continues as one or more HAB-produced toxins are extracted into the organic phase (step 406). For example, one or more brevetoxins in the aqueous phase may be extracted into the organic phase by virtue of the solubility of the one or more brevetoxins in the vegetable oil, mineral oil, or other suitable oil.

The method 400 continues as the toxin-enriched organic phase is separated from the toxin-depleted aqueous phase (step 408). For example, centrifugal force of rotation of the hollow rotor of the ACC forces the more dense phase (e.g., the brevetoxin-depleted seawater) outward against the outer wall of the hollow rotor of the ACC. The less dense phase (e.g., the brevetoxin-enriched oil) is displaced radially inwardly towards the shaft of the hollow rotor of the ACC. The brevetoxin-enriched oil flows over the lighter phase weir of the ACC and is collected in a channel from which it exits the ACC at the lighter phase outlet port. The brevetoxin-depleted seawater flows over the heavier phase weir and is collected in a channel from which it exits the ACC at the heavier phase outlet port.

Each of steps 404, 406 and 408 may be performed, at least partially, substantially simultaneously and continuously within the ACC.

Figure 5B:
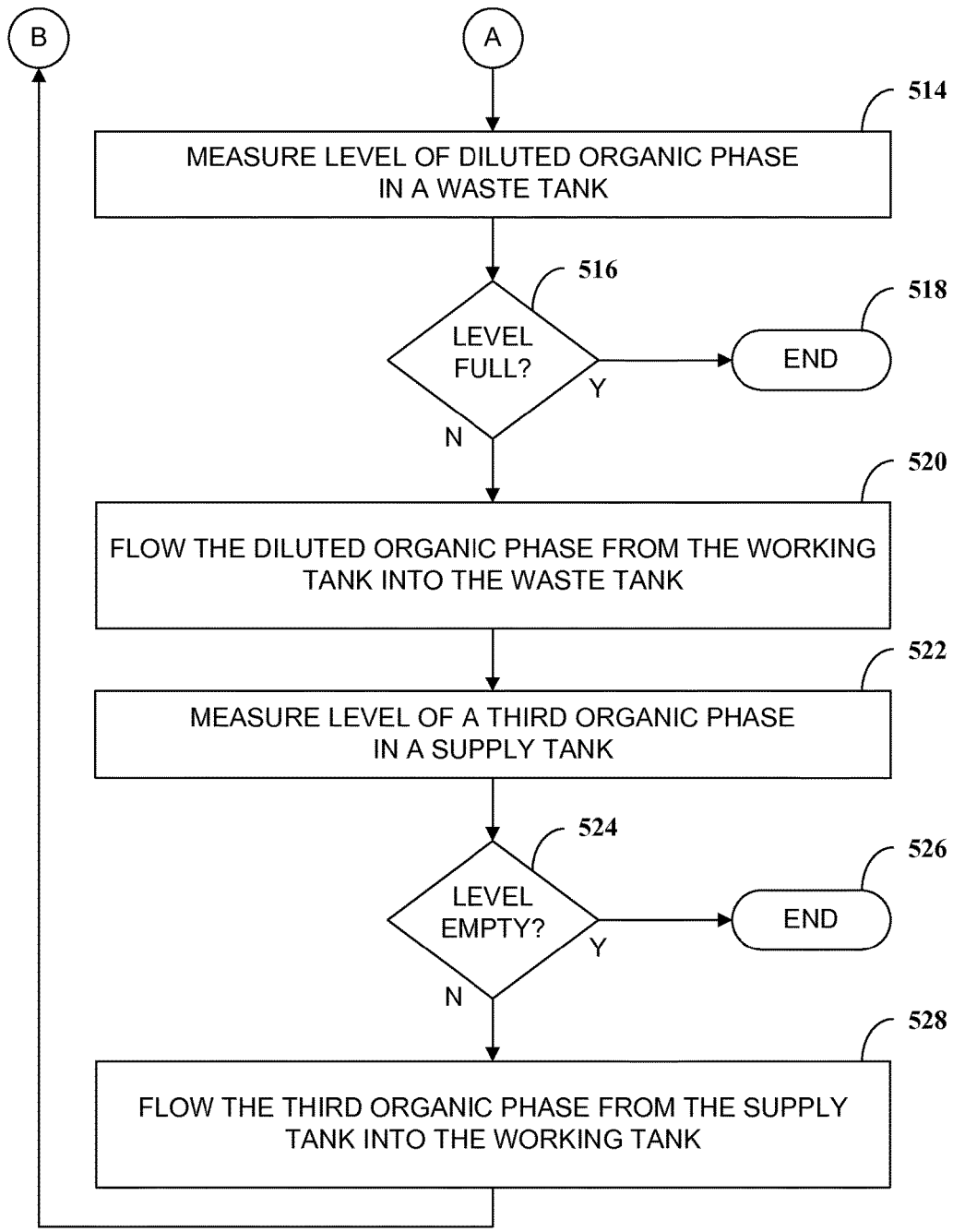

FIGS. 5A and 5B illustrate a flow diagram of a method 500 for controlling the removal of one or more HAB-produced toxins from a body of water in accordance with the some embodiments of the present invention. In the method 500, the steps discussed below (steps 502-528) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The method 500 begins with the activation of the liquid-liquid extraction system for removing one or more toxins produced by a harmful algal bloom (HAB) from a body of water (step 502). For example, the brevetoxin removal application (135 in FIG. 1) may be configured to activate an ACC by turning on an electric motor that rotates the hollow rotor of the ACC.

Then, the method 500 continues as an organic phase enriched in one or more HAB-produced toxins is flowed into a working tank containing a second organic phase to produce a diluted organic phase (step 504). For example, the brevetoxin removal application (135 in FIG. 1) may be configured to control the flow of brevetoxin-enriched oil into a working tank by controlling one or more pumps and/or one or more valves that may be installed between the lighter phase outlet port of the ACC and an inlet port of the working tank.

The method 500 then continues as diluted organic phase is recirculated (step 506). For example, the brevetoxin removal application (135 in FIG. 1) may be configured to control the flow of to control the flow of the diluted organic phase by controlling one or more pumps and/or one or more valves that may be installed between an outlet port of the working tank and the lighter phase inlet port of the ACC.

Then, the method 500 continues with the measurement of a concentration of the one or more HAB-produced toxins in the diluted organic phase (step 508). For example, the brevetoxin removal application (135 in FIG. 1) may be configured to periodically cause a sensor in the working tank to measure the brevetoxin concentration in the diluted organic phase. The method 500 then determines whether the measured concentration exceeds a predetermined threshold (step 510). For example, the brevetoxin removal application (135 in FIG. 1) may be configured to make the determination of whether the measured brevetoxin concentration exceeds the predetermined threshold by comparing the measured brevetoxin concentration (140 in FIG. 1) and the threshold brevetoxin concentration (145 in FIG. 1). If the measured concentration does not exceed the predetermined threshold (step 510=No), the method 500 returns to step 504. On the other hand, if the measured concentration exceeds the predetermined threshold (step 510=Yes), the method 500 continues by deactivating the liquid-liquid extraction system (step 512). For example, the brevetoxin removal application (135 in FIG. 1) may be configured to deactivate the ACC by turning off an electric motor that rotates the hollow rotor of the ACC.

The method 500 then continues with the measurement of a fluid level of the diluted organic phase in a waste tank (step 514). For example, the brevetoxin removal application (135 in FIG. 1) may be configured to cause a sensor in the waste tank to perform this fluid level measurement. The method 500 then determines whether the measured fluid level of the diluted organic phase in the waste tank indicates the waste tank is too full to accommodate the diluted organic phase to be received from the working tank (step 516). For example, the brevetoxin removal application (135 in FIG. 1) may be configured to make this determination. If the measured fluid level indicates that the waste tank is too full to accommodate the diluted organic phase to be received from the working tank (step 516=Yes), the method 500 ends (step 518). On the other hand, if the measured fluid level indicates that the waste tank is not too full to accommodate the diluted organic phase to be received from the working tank (step 516=No), the method 500 continues by flowing the diluted organic phase from the working tank into the waste tank (step 520). For example, the brevetoxin removal application (135 in FIG. 1) may be configured to control the flow of the diluted organic phase from the working tank into the waste tank by controlling one or more pumps and/or one or more valves that may be installed between those tanks.

Then, the method 500 continues with the measurement of a fluid level of the third organic phase (i.e., fresh oil) in a supply tank (step 522). For example, the brevetoxin removal application (135 in FIG. 1) may be configured to cause a sensor in the supply tank to perform this fluid level measurement. The method 500 then determines whether the measured fluid level of the third organic phase in the supply tank indicates the supply tank has a sufficient supply of fresh oil to charge the working tank (step 524). For example, the brevetoxin removal application (135 in FIG. 1) may be configured to make this determination. If the measured fluid level indicates that the supply tank is too empty to charge the working tank (step 524=Yes), the method 500 ends (step 526). On the other hand, if the measured fluid level indicates that the supply tank is not too empty to charge the working tank (step 524=No), the method 500 continues by flowing the fresh oil from the supply tank into the working tank (step 528). For example, the brevetoxin removal application (135 in FIG. 1) may be configured to control the flow of the fresh oil from the supply tank into the working tank by controlling one or more pumps and/or one or more valves that may be installed between those tanks. The method 500 then returns to step 502.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. An apparatus comprising:
    a liquid-liquid extraction system configured to remove one or more toxins produced by a harmful algal bloom (HAB) from a body of water, the liquid-liquid extraction system comprising an annular centrifugal contactor, the annular centrifugal contactor comprising:
        a heavier phase inlet port configured to receive an aqueous phase comprising water, algae, and one or more HAB-produced toxins;
        a lighter phase inlet port configured to receive an organic phase;
        an annular mixing zone configured to contact the aqueous phase and the organic phase;
        a hollow rotor configured to extract the one or more HAB-produced toxins into the organic phase and to separate the organic phase enriched in the one or more HAB-produced toxins from the aqueous phase depleted in the one or more HAB-produced toxins;
        an electric motor configured to rotate the hollow rotor;
        a lighter phase outlet port configured to output the organic phase enriched in the one or more HAB-produced toxins; and
        a heavier phase outlet port configured to output the aqueous phase depleted in the one or more HAB-produced toxins;
    a working tank having an inlet port and an outlet port and configured to contain a second organic phase, wherein the inlet port of the working tank is coupled to the lighter phase outlet port of the annular centrifugal contactor through one or more flow control components, and wherein the outlet port of the working tank is coupled to the lighter phase inlet port of the annular centrifugal contactor through one or more flow control components;
    a waste tank coupled to the working tank through one or more flow control components;
    a sensor configured to measure the concentration of the one or more HAB-produced toxins;
    a supply tank coupled to the working tank through one or more flow control components and configured to contain a third organic phase;
    a memory; and
    at least one processor coupled to the memory, and programmed to:
        activate the liquid-liquid extraction system by activating the electric motor;
        flow the organic phase enriched in the one or more HAB-produced toxins from the lighter phase outlet port of the annular centrifugal contactor, through the inlet port of the working tank, and into the working tank containing the second organic phase to produce a diluted organic phase by controlling the one or more flow control components installed between the lighter phase outlet port of the annular centrifugal contactor and the inlet port of the working tank;
        recirculate the diluted organic phase as the organic phase from the outlet port of the working tank, through the lighter phase inlet port of the annular centrifugal contactor, and into the annular mixing zone of the annular centrifugal contactor by controlling the one or more flow control components installed between the outlet port of the working tank and the lighter phase inlet port of the annular centrifugal contactor;
        measure a concentration of the one or more HAB-produced toxins in the diluted organic phase by causing the sensor to measure the concentration of the one or more HAB-produced toxins in the diluted organic phase;
        determine whether the concentration of the one or more HAB-produced toxins in the diluted organic phase exceeds a predetermined threshold by comparing the measured concentration and the predetermined threshold;
        remove the diluted organic phase from the working tank in response to determining that the concentration of the one or more HAB-produced toxins in the diluted organic phase exceed the predetermined threshold by flowing the diluted organic phase from the working tank to the waste tank by controlling the one or more flow control components installed between the working tank and the waist tank;
        replace the diluted organic phase removed from the working tank with the third organic phase by flowing the third organic phase from the supply tank into the working tank by controlling the one or more flow control components installed between the supply tank and the working tank.

2. The apparatus as recited in claim 1, wherein the heavier phase inlet port of the annular centrifugal contactor is configured to receive the aqueous phase from an upper portion of a water column containing *Karenia brevis*, wherein the one or more HAB-produced toxins comprises one or more brevetoxins, and wherein the processor is further programmed to flow the aqueous phase depleted in the one or more brevetoxins back into the water column containing *Karenia brevis* by controlling a pump configured to pump the brevetoxin-depleted water out of the heavier phase outlet port of the annular centrifugal contactor.

3. A computer program product comprising:
a plurality of executable instructions provided on non-transitory computer readable media, wherein the executable instructions, when executed by at least one processor in a digital computing device, cause the digital computing device to:
activate a liquid-liquid extraction system for removing one or more toxins produced by a harmful algal bloom (HAB) from a body of water, the liquid-liquid extraction system comprising:
a source of an aqueous phase comprising water, algae, and one or more HAB-produced toxins;
an annular centrifugal contactor in which the aqueous phase is contacted with an organic phase to extract the one or more HAB-produced toxins into the organic phase and to separate the organic phase enriched in the one or more HAB-produced toxins from the aqueous phase depleted in the one or more HAB-produced toxins;
flow the organic phase enriched in the one or more HAB-produced toxins into a working tank containing a second organic phase to produce a diluted organic phase;
recirculate the diluted organic phase as the organic phase;
measure a concentration of the one or more HAB-produced toxins in the diluted organic phase;
determine whether the concentration of the one or more HAB-produced toxins in the diluted organic phase exceeds a predetermined threshold;
remove the diluted organic phase from the working tank in response to determining that the concentration of the one or more HAB-produced toxins in the diluted organic phase exceed the predetermined threshold by flowing the diluted organic phase from the working tank to a waste tank;
replace the diluted organic phase removed from the working tank with a third organic phase by flowing the third organic phase from a supply tank into the working tank.

4. The computer program product as recited in claim 3, wherein the source of the aqueous phase comprising water, algae, and one or more HAB-produced toxins comprises an upper portion of a water column containing *Karenia brevis*, wherein the one or more HAB-produced toxins comprises one or more brevetoxins, and wherein the executable instructions further cause the digital computing device to flow the aqueous phase depleted in the one or more brevetoxins back into the water column containing *Karenia brevis*.

5. The apparatus as recited in claim 1, wherein the one or more flow control components include one or more pumps and/or one or more valves.

6. The apparatus as recited in claim 1, further comprising a pre-mix vessel inline before the lighter phase inlet port of the annular centrifugal contactor and configured to receive both the aqueous phase and the organic phase and to output a mixed phase to the lighter phase inlet port of the annular centrifugal contactor.

7. The apparatus as recited in claim 1, wherein the organic phase comprises an oil selected from a group consisting of vegetable oils, mineral oils, and combinations thereof.

\* \* \* \* \*